UNITED STATES PATENT OFFICE 2,402,590

CHEMICAL COMPOUNDS AND PROCESSES

Herrick R. Arnold, Brandywine Hundred, Del., assignor to E. I. du Pont de Nemours & Company, Wilmington, Del., a corporation of Delaware No Drawing. Application March 28, 1945,
Serial No. 585,395

3 Claims. (Cl. 260—500)

This invention relates to new organoboron compounds.

While boronic acids have been known for some time they have not become of industrial importance. One reason for this is that methods for obtaining these acids are involved and costly. Moreover, certain of the acids are unstable in air and others are too limited in their reactivity.

An object of this invention is to provide a boronic acid and the corresponding anhydride that can be obtained simply and economically. A further object is to provide a boronic acid that is stable in air and has other useful properties. Other objects will appear hereinafter.

These objects are realized in chlorovinylboronic acid, $ClCH=CHB(OH)_2$ and its anhydride, chlorovinylboron oxide, $(ClCH=CHBO)_3$.

Chlorovinylboronic acid is a white crystalline solid. It melts at 128–129° C. to a colorless liquid. It is soluble in water at 25° C. to the extent of about 6.8% and at 65° C., its solubility in water is about 15%. It is also soluble in the lower aliphatic alcohols, glycols, ethers, acetic acid, benzene and chloroform.

The new acid is obtained readily by hydrolyzing chlorovinylboron dichloride. A suitable procedure is to add the latter compound slowly to 3 times its weight of crushed ice. Hydrolysis is practically instantaneous. When the ice is melted, the cold slurry is filtered and washed with a small quantity of cold water. The crude chlorovinylboronic acid is then air dried. The material so obtained is of good purity. It can be further refined by dissolving it in 5 times its weight of water at 50° C., filtering to remove undissolved impurities, and cooling the solution to a low temperature, whereby the pure acid crystallizes out and may be separated and dried. The yield of acid obtained from the dichloride is above 75%. Analytical data agree with the structural formula assigned. The analysis is as follows:

|  | Carbon | Hydrogen | Chlorine | Boron |
|---|---|---|---|---|
| Found, percent | 22.75<br>22.67 | 2.94<br>2.86 | 32.61<br>32.61 | 10.19<br>10.30 |
| Calculated for, percent $C_2H_4O_2ClB$ | 22.60 | 2.79 | 32.85 | 10.15 |

Chlorovinylboron dichloride from which the acid is obtained is prepared by the vapor phase reaction of boron trichloride with acetylene over a mercurous chloride on active carbon catalyst at 150–300° C. as described in my copending concurrently filed application Serial No. 585,394. Thus, chlorovinylboronic acid is readily available by simple operations from acetylene, boron trichloride and water.

When chlorovinylboronic acid is dried in a vacuum in the presence of concentrated sulfuric acid, it loses water with the formation of chlorovinylboron oxide. This new product is a white solid melting at 55° C. Molecular weight determination indicates that this material exists in trimeric form. It dissolves in water regenerating chlorovinylboronic acid and for many uses is equivalent to the acid.

Chlorovinylboronic acid has fungicidal properties. It is a modifier for vinyl polymers. As a synthetic intermediate, it enables the chlorovinylboron group to be introduced into a variety of hydroxylated organic compounds by virtue of the great ease with which it undergoes esterification. Aqueous solutions of chlorovinylboronic acid can be used to maintain a pH of about 4 against the addition of alkalies or ammonia. Chlorovinylboron oxide is equivalent to the acid for most of these uses.

As many apparently widely different embodiments of this invention may be made without departing from the spirit and scope thereof, it is to be understood that I do not limit myself to the specific embodiments thereof except as defined in the appended claims.

I claim:

1. New organoboron compounds selected from the group consisting of chlorovinylboronic acid and its anhydride, chlorovinylboron oxide.
2. Chlorovinylboronic acid.
3. A process of preparing chlorovinylboronic acid which comprises hydrolyzing chlorovinylboron dichloride.

HERRICK R. ARNOLD.